(12) United States Patent
Imanishi et al.

(10) Patent No.: US 9,203,314 B2
(45) Date of Patent: Dec. 1, 2015

(54) CONVERTER CONTROLLING APPARATUS AND MULTIPHASE CONVERTER

(75) Inventors: Hiroyuki Imanishi, Toyota (JP); Kota Manabe, Toyota (JP); Nobuyuki Kitamura, Minamitsuru-gun (JP); Takahiko Hasegawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 52 days.

(21) Appl. No.: 13/382,773

(22) PCT Filed: Jul. 9, 2009

(86) PCT No.: PCT/JP2009/062540
§ 371 (c)(1),
(2), (4) Date: Jan. 6, 2012

(87) PCT Pub. No.: WO2011/004486
PCT Pub. Date: Jan. 13, 2011

(65) Prior Publication Data
US 2012/0106204 A1    May 3, 2012

(51) Int. Cl.
| | | |
|---|---|---|
| *G05F 1/10* | (2006.01) | |
| *H02M 3/158* | (2006.01) | |
| *B60L 11/18* | (2006.01) | |
| *B60L 15/00* | (2006.01) | |

(52) U.S. Cl.
CPC ......... *H02M 3/1584* (2013.01); *B60L 11/1881* (2013.01); *B60L 15/007* (2013.01); *B60L 2210/40* (2013.01); *B60L 2270/147* (2013.01); *Y02T 10/7241* (2013.01); *Y02T 90/34* (2013.01)

(58) Field of Classification Search
CPC ......... H02M 3/158; H02M 2001/009; H02M 2001/0045; H02M 3/1588; H02M 3/1584
USPC ........................ 323/225, 271, 272, 267, 268
See application file for complete search history.

(56) References Cited

U.S. PATENT DOCUMENTS

| | | | |
|---|---|---|---|
| 6,943,535 B1 * | 9/2005 | Schiff | 323/246 |
| 8,193,796 B2 * | 6/2012 | Tang et al. | 323/283 |
| 8,896,280 B2 * | 11/2014 | Tang et al. | 323/272 |

(Continued)

FOREIGN PATENT DOCUMENTS

| | | |
|---|---|---|
| DE | 10216251 A1 | 10/2002 |
| DE | 10216252 A1 | 11/2003 |

(Continued)

OTHER PUBLICATIONS

International Search Report mailed Sep. 8, 2009 of PCT/JP2009/062540.

(Continued)

*Primary Examiner* — Adolf Berhane
*Assistant Examiner* — Alex Torres-Rivera
(74) *Attorney, Agent, or Firm* — Kenyon & Kenyon LLP

(57) ABSTRACT

A driving frequency setting portion is provided. The driving frequency setting portion sets a switching frequency of a switching element on the basis of a notification from a driving phase number switching portion. A ripple current detected by a current sensor is in inverse proportion to inductance of reactor. Since a ripple current becomes the largest in the single-phase driving, in this embodiment, considering both the ripple current and switching loss, a switching frequency for the single-phase driving is set higher than a switching frequency for multiphase driving.

2 Claims, 19 Drawing Sheets

(56) References Cited

U.S. PATENT DOCUMENTS

| | | | |
|---|---|---|---|
| 2007/0080671 A1 | 4/2007 | Qahouq et al. | |
| 2008/0303495 A1* | 12/2008 | Wei et al. | 323/272 |
| 2009/0189580 A1* | 7/2009 | Akahane et al. | 323/282 |
| 2010/0002477 A1 | 1/2010 | Hasegawa et al. | |
| 2011/0018519 A1* | 1/2011 | Chatroux et al. | 323/299 |
| 2012/0074919 A1 | 3/2012 | Hasegawa et al. | |
| 2013/0038306 A1* | 2/2013 | Kelly et al. | 323/283 |

FOREIGN PATENT DOCUMENTS

| | | |
|---|---|---|
| DE | 112006002679 T5 | 8/2008 |
| DE | 112009004843 T5 | 9/2012 |
| JP | 10094249 A | 4/1998 |
| JP | 2000-358362 A | 12/2000 |
| JP | 2002-044941 A | 2/2002 |
| JP | 2003-235252 A | 8/2003 |
| JP | 2006-187140 A | 7/2006 |
| JP | 2006-340535 A | 12/2006 |
| JP | 2006340476 A | 12/2006 |
| JP | 2007-006669 A | 1/2007 |
| JP | 2008182815 A | 8/2008 |
| JP | 2008-295228 A | 12/2008 |
| JP | 2010-119177 A | 5/2010 |
| WO | 0159539 A1 | 8/2001 |
| WO | 2006098376 A1 | 9/2006 |
| WO | WO 2009115559 A1 * | 9/2009 |

OTHER PUBLICATIONS

German Office Action for German Application No. 1120090050549 dated Jun. 20, 2013 and English translation.

* cited by examiner

<Mode2>

<Mode4>

<Mode6>

US 9,203,314 B2

CONVERTER CONTROLLING APPARATUS AND MULTIPHASE CONVERTER

This is a 371 national phase application of PCT/JP2009/062540 filed 9 Jul. 2009, the contents of which are incorporated herein by reference.

TECHNICAL FIELD

The present invention relates to a converter controlling apparatus and a multiphase converter for controlling an output voltage of a fuel cell.

BACKGROUND ART

For an on-board fuel cell system for automobiles and the like, various hybrid fuel cell systems provided with both a fuel cell and a battery as a power source have been proposed for addressing situations such as rapid load variation beyond the power generating capacity of a fuel cell.

In a hybrid fuel cell system, the output voltage and others of the fuel cell are controlled by a DC-DC converter. A widely used DC-DC converter for such control is of a type that operates switching elements, such as power transistors, IGBTs, or FETs, in a PWM fashion to convert a voltage. With the advance of electronic equipment of smaller size with less power consumption and higher performance, there is a demand for a DC-DC converter with a faster speed, a larger capacity, and reduced ripples. In order to meet such a demand, a multiphase DC-DC converter is conventionally used, which is made up of multiple DC-DC converters connected in parallel to each other (see Patent Literature 1).

CITATION LIST

Patent Literature

Patent Literature 1: Japanese Patent Laid-Open No. 2006-340535

SUMMARY OF INVENTION

Technical Problem

In a conventional multiphase DC-DC converter, when a plurality of phases are driven (multiphase driving), if a DC-DC converter in each phase is driven in the same phase (that is, if a switching element constituting a converter in each phase is controlled to be turned on/off in the same phase), a ripple current becomes larger in proportion to the number of phases.

FIG. 18 is a diagram exemplifying current waveforms of a single-phase driving (broken line) of a three-phase DC-DC converter and a multiphase driving in the same phase (solid line). As shown in FIG. 18, if the three-phase DC-DC converter is driven in the same phase, a ripple current ΔIn3 in the multiphase driving becomes larger than the ripple current ΔIn1 in the single-phase driving (the ripple current is in proportion to the number of driving phases). Thus, when a system is to be designed, a capacitor having a large allowable amount needs to be selected as a capacitor which smoothes the current, and there has been a problem that the size of the capacitor becomes large.

In order to solve such problem, a method of driving a DC-DC converter by shifting the phase has been proposed. FIG. 19 is a diagram exemplifying current waveforms of the single-phase driving of the three-phase DC-DC converter (broken line) and the multiphase driving with a shifted phase (solid line) and corresponds to FIG. 18.

As shown in FIG. 19, if the three-phase DC-DC converter is driven in multiphase by shifting the phase, the ripple current in each phase cancels each other, and the amplitude of the ripple current ΔIp3 attenuates and becomes smaller than the ripple current ΔIp1 in the single-phase driving. As described above, the ripple current ΔIp3 when the three-phase DC-DC converter is driven by shifting the phase becomes smaller than the ripple current ΔIn3 when the three-phase DC-DC converter is driven in the same phase, an allowable amount of the capacitor can be decreased, and the size can be reduced.

However, by only driving the DC-DC converter by shifting the phase, a decrease in the allowable amount of the capacitor is limited, and there has been a problem that the recent demand for further size reduction of a capacitor cannot be met.

The present invention was made in view of the above-described description and has an object to provide a converter controlling apparatus and the like that can meet the demand of further size reduction of a capacitor.

Solution To Problem

In order to solve the above problems, a converter controlling apparatus according to the present invention is a controlling apparatus for a multiphase converter for controlling a fuel cell output, which controls driving of each phase by shifting the phase and is provided with driving-frequency control means which sets a driving frequency of a converter if the multiphase converter is driven in a single phase higher than the driving frequency of the converter driven in multiple phases by a predetermined amount.

According to the above configuration, not only by controlling the driving of the converter by simply shifting the phase, in single-phase driving in which the ripple current becomes large, a switching frequency f1 for single-phase driving is set higher than a switching frequency f2 (<f1) for multiphase driving by a predetermined amount. As a result, the ripple current in the single-phase driving can be decreased, and the allowable amount of a filter/capacitor C1 designed in compliance with this ripple current can be reduced, and finally, the size of the capacitor can be reduced than before.

In the above configuration, such a mode is preferable that determining means which determines the number of driving phases of the multiphase converter in accordance with the size of a load connected to the multiphase converter is further provided, and the driving-frequency control means sets the driving frequency of the converter in the single-phase driving on the basis of the size of the ripple current and the size of a switching loss generated in the single-phase driving.

In a further preferred aspect, in the above configuration, a converter for each of the phases is a soft switching converter including a main boost circuit and an auxiliary circuit, the main boost circuit has a main coil having one end thereof connected to a terminal on a high potential side of the fuel cell, a main switch for switching operation having one end thereof connected to the other end of the main coil and having the other end thereof connected to a terminal on a low potential side of the fuel cell, a first diode having a cathode connected to the other end of the main coil, and a smoothing capacitor provided between an anode of the first diode and the other end of the main switch, the auxiliary circuit has a first series connected section including a second diode and a snubber capacitor, the first series connected section being connected in parallel to the main switch and connected to the other end of the main coil and to a terminal on the low potential side of the fuel cell, and a second series connected section including a third diode, an auxiliary coil, and the auxiliary switch, the second series connected section being connected between a connecting node of the second diode with the snubber capacitor and the one end of the main coil.

Also, in the multiphase converter for controlling a fuel cell output according to the present invention, an inductance value of a coil of the converter used in the single-phase driving is set higher than the inductance value of the coil of a converter in another phase.

Advantageous Effects of Invention

According to the present invention, the demand for further size reduction of a capacitor can be met.

DESCRIPTION OF EMBODIMENTS

A. Embodiment

Figure 1:
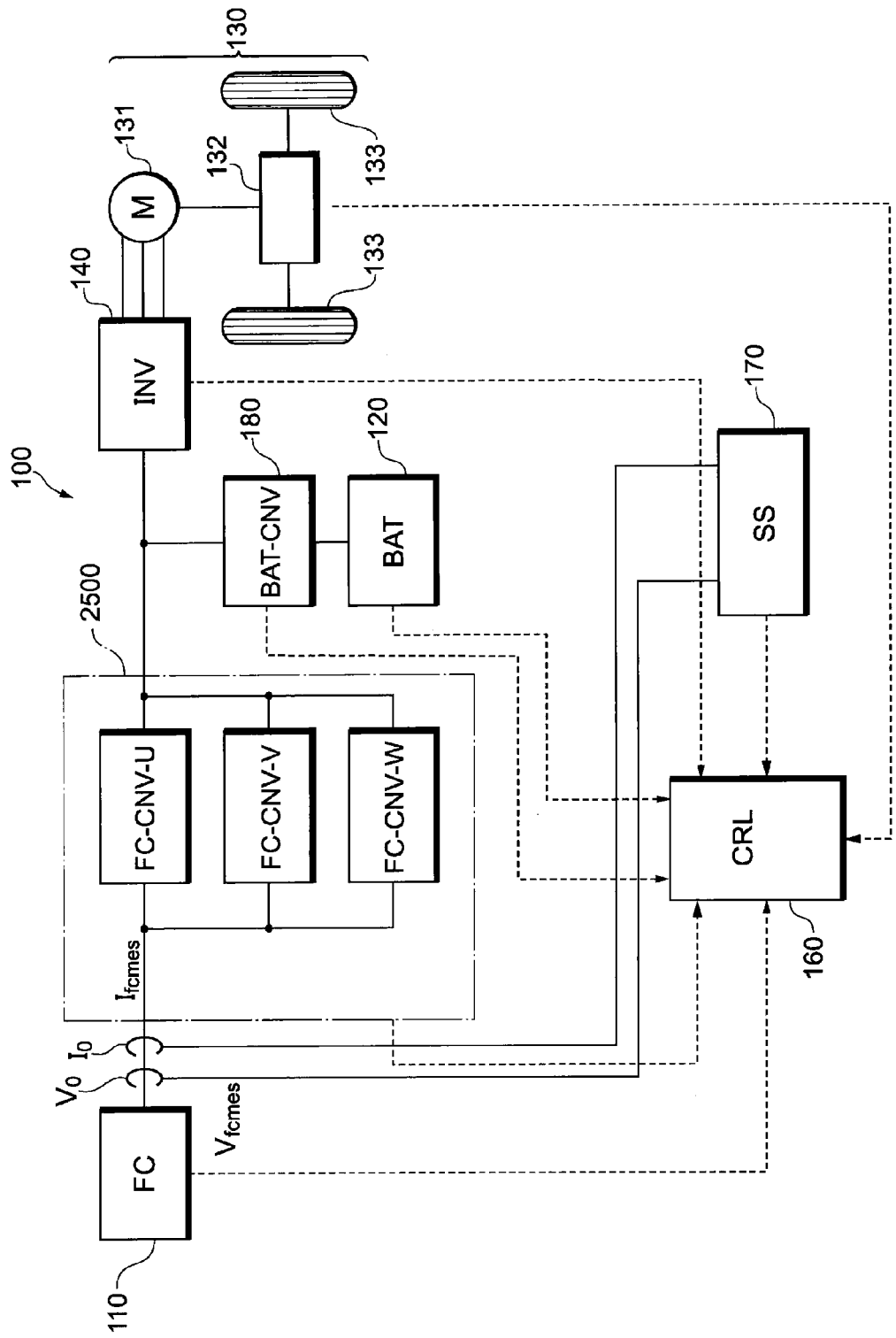
FIG. 1 is a system configuration diagram of an FCHV system according to this embodiment.

An embodiment of the invention will now be described with reference to the drawings. FIG. 1 shows a configuration of an FCHV system on a vehicle, according to the embodiment. Although a Fuel Cell Hybrid Vehicle (FCHV) is cited as an example of the vehicle in the description below, the embodiment may be applicable to electric vehicles and the like. The embodiment may also be applicable to not only various vehicles (for example, ships, aircrafts, robots, and the like) but also portable fuel cell systems.

A-1. Entire System Configuration

An FCHV system 100 is provided with an FC converter 2500 between a fuel cell 110 and an inverter 140 and is also provided with a DC-DC converter (hereinafter referred to as "battery converter") 180 between a battery 120 and the inverter 140.

The fuel cell 110 is a solid polymer electrolyte cell stack made up of multiple unit cells connected in series. A voltage sensor V0 for detecting an output voltage Vfcmes of the fuel cell 110 and a current sensor I0 for detecting an output current Ifcmes are attached to the fuel cell 110. In the fuel cell 110, an oxidation reaction occurs at an anode in accordance with the equation (1) and a reduction reaction occurs at a cathode in accordance with the equation (2); an electromotive reaction thus occurs in the entire fuel cell 110 in accordance with the equation (3).

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A unit cell has a structure in which an MEA, which is made up of a polymer electrolyte membrane or the like sandwiched between a fuel electrode and an air electrode, is further sandwiched between separators for supplying a fuel gas and an oxidizing gas. The anode is made up of an anode catalyst layer provided on a porous support layer, and the cathode is made up of a cathode catalyst layer provided on a porous support layer.

The fuel cell 110 is provided with a supply system of fuel gas for the anode, a supply system of oxidizing gas for the cathode, and a feeding system of cooling liquid (all not shown), and can generate a desired electric power by controlling the amount of supply of the fuel gas and the oxidizing gas in response to a control signal from a controller 160.

The FC converter 2500 is responsible for controlling the output voltage Vfcmes of the fuel cell 110, and is a two-way voltage converter that converts (boosts or reduces) the output voltage Vfcmes received at the primary side (input side: fuel cell 110 side) into a voltage having a different value from that of the primary side to output it to the secondary side (output side: inverter 140 side) or conversely converts a voltage received at the secondary side into a voltage having a different value from that of the secondary side to output it to the primary side. The FC converter 2500 is used to control the output voltage Vfcmes of the fuel cell 110 so that the voltage corresponds to a target voltage.

The battery 120 is connected in parallel to the fuel cell 110 relative to a load 130, and serves as a storage for a surplus electric power, a storage for regenerative energy during regenerative braking, and an energy buffer during load variation in association with acceleration or deceleration of the fuel cell vehicle. The battery 120 that may be used includes a secondary battery such as a nickel-cadmium battery, a nickel-hydrogen battery, and a lithium secondary battery.

The battery converter 180 is responsible for controlling an input voltage to the inverter 140, and has a circuit configuration similar to the FC converter 2500, for example. A boost converter may be used for the battery converter 180, or instead a buck-boost converter capable of boosting and reducing a voltage may be used, and any configuration that allows controlling an input voltage to the inverter 140 may be used.

The inverter 140 is, for example, a PWM inverter driven in a pulse width modulation, and is responsive to a control command from the controller 160 to convert a DC power output from the fuel cell 110 or the battery 120 into a three-phase AC power to control the running torque of a traction motor 131.

The traction motor 131 provides a main motive power for the vehicle, and also generates a regenerative power during deceleration. A differential 132 is a decelerator, and decelerates the high speed rotation of the traction motor 131 to a predetermined number of revolutions and rotates a shaft provided with tires 133. The shaft is provided with a wheel speed sensor (not shown) or the like to sense the speed of the vehicle. In this embodiment, all equipment (including the traction motor 131 and the differential 132) operable with a power supplied from the fuel cell 110 is collectively referred to as the load 130.

The controller 160 is a computer system for controlling the FCHV system 100, and includes, for example, a CPU, a RAM, and a ROM. The controller 160 determines a required power from the load 130 (i.e. a required power from the entire system) with various signal inputs (for example, a signal indicative of the position of a throttle, a signal indicative of the vehicle speed, and signal indicative of the output current or output terminal voltage of the fuel cell 110) supplied from sensors 170.

The required power from the load 130 is, for example, a sum of the power for running the vehicle and the power for auxiliary machinery. The power for auxiliary machinery includes a power consumed by on-board machinery (such as a humidifier, an air compressor, a hydrogen pump, and a cooling water circulation pump), a power consumed by devices required for running the vehicle (such as a transmission, a wheel control device, a steering device, and a suspension), a power consumed by devices located in a passenger space (such as an air conditioner, lighting equipment, and an audio system), and the like.

The controller (controlling apparatus for a multiphase converter for controlling a fuel cell output) 160 determines a share of an output power between the fuel cell 110 and the battery 120, and calculates a command value for power generation. The controller 160 determines a required power from each of the fuel cell 110 and the battery 120, and then controls the operation of the FC converter 2500 and the battery converter 180 to attain the required power.

A-2. FC Converter Configuration

As shown in FIG. 1, the FC converter 2500 is provided with a circuit configuration as a three-phase resonance converter composed of a U-phase, a V-phase, and a W-phase. In the circuit configuration of the three-phase resonance converter, a circuit portion resembling an inverter, which converts an inputted DC voltage to an AC voltage once and a portion which rectifies and converts the AC voltage to a different DC voltage are combined. In this embodiment, a multiphase soft switching converter (hereinafter referred to as a multiphase FC soft switching converter) provided with a freewheeling circuit (the details will be described later) as the FC converter 2500 is employed as the FC converter 2500.

A-2-1. Description of Multiphase FC Soft Switching Converter

Figure 2:
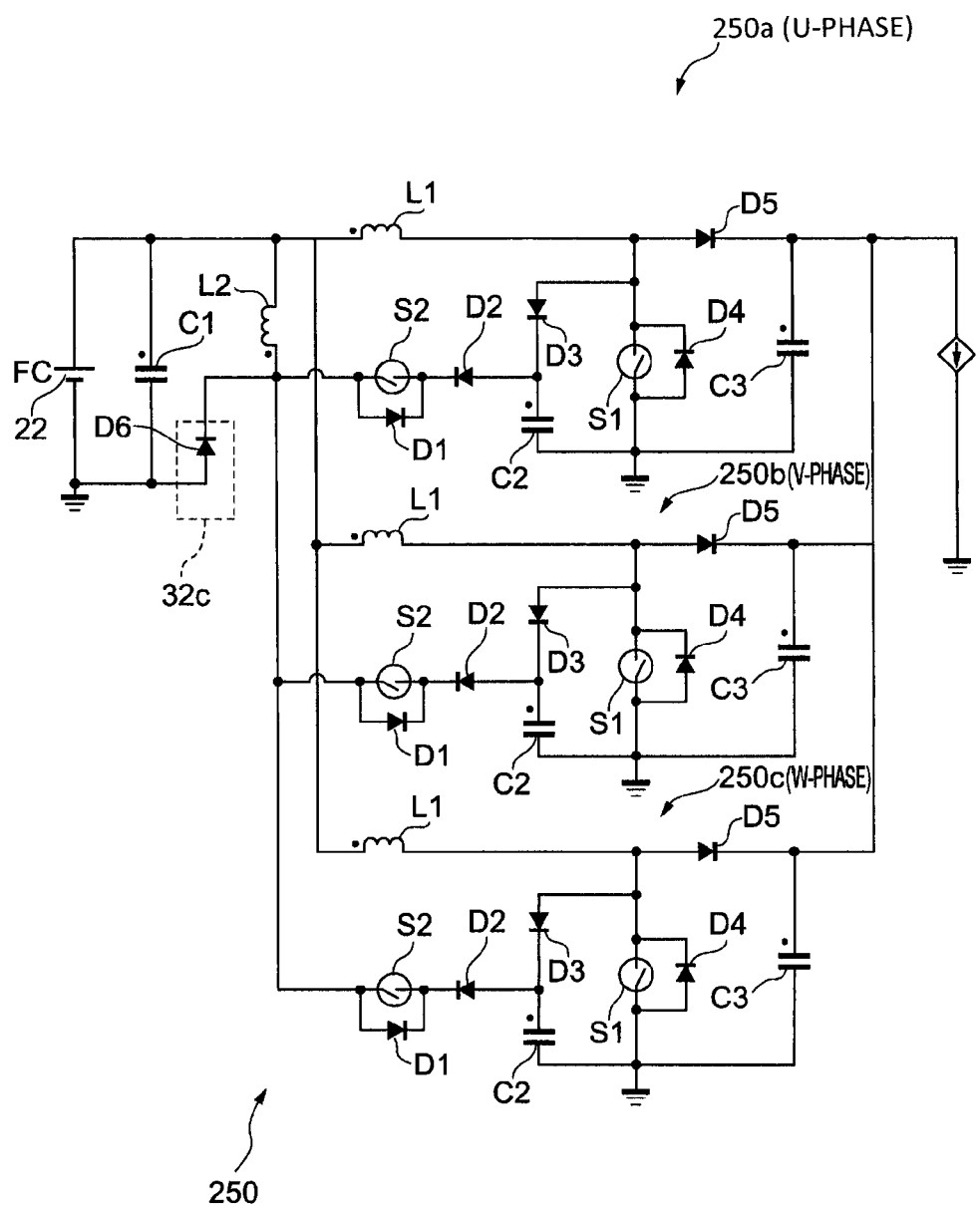
FIG. 2 is a diagram illustrating a circuit configuration of a multiphase FC soft switching converter according to the embodiment.
Figure 3:
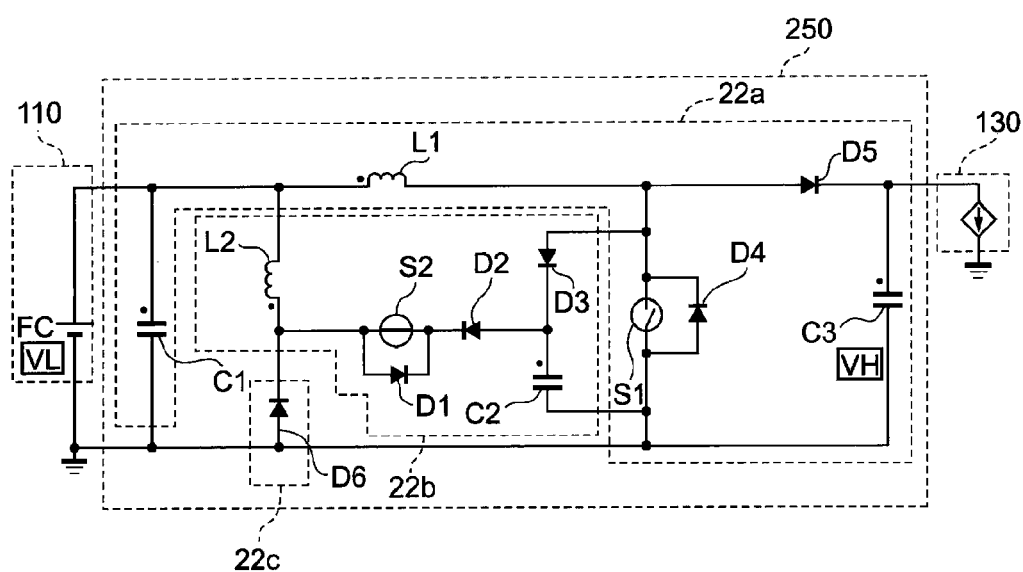
FIG. 3 is a diagram illustrating one phase of a circuit configuration of the FC soft switching converter according to the embodiment.

FIG. 2 is a diagram illustrating a circuit configuration of the multiphase FC soft switching converter 2500 mounted on the FCHV system 100, and FIG. 3 is a diagram illustrating one phase of a circuit configuration of the multiphase FC soft switching converter 2500.

In the following description, each of U-phase, V-phase, and W-phase FC soft switching converters constituting the multiphase FC soft switching converter 2500 is referred to as FC soft switching converters 250a, 250b, and 250c, respectively, and if no distinction is needed, they are simply called the FC soft switching converter 250. Also, an unboosted voltage inputted to the FC soft switching converter 250 is referred to as a converter input voltage Vin, and a boosted voltage output from the FC soft switching converter 250 is referred to as a converter output voltage Vout.

As shown in FIG. 3, each FC soft switching converter 250 includes a main boost circuit 22a for a boosting operation, an auxiliary circuit 22b for a soft switching operation, and a freewheeling circuit 22c.

The main boost circuit 22a boosts an output voltage of a fuel cell 110 by releasing energy stored in a coil L1 to a load 130 through a diode D5 by means of a switching circuit, which is composed of a first switching element S1 consisting of an IGBT (Insulated Gate Bipolar Transistor) or the like and a diode D4, performing switching operations.

Specifically, one end of the coil L1 is connected to a terminal on the high potential side of the fuel cell 110, one end node of the first switching element S1 is connected to the other end of the coil L1, and the other end node of the first switching element S1 is connected to a terminal on the low potential side of the fuel cell 110. Also, an anode terminal of the diode D5 is connected to the other end of the coil L1, and a capacitor C3 that functions as a smoothing capacitor is connected between a cathode of the diode D5 and the other end of the first switching element S1. In the main boost circuit 22a, a filter/capacitor C1 is provided on the side of the fuel cell 110, and thus, ripples in an output current of the fuel cell 110 can be reduced.

A voltage VH applied to the capacitor C3 is a converter output voltage Vout of the FC soft switching converter 150, and a voltage VL applied to the filter/capacitor C1 is an output voltage of the fuel cell 110 and is also a converter input voltage Vin to the FC soft switching converter 150.

The auxiliary circuit 22b includes a first series connected section including a diode D3 and a snubber capacitor C2 connected in series to the diode D3, the first series connected section being connected in parallel to the first switching element S1. In the first series connected section, an anode terminal of the diode D3 is connected to the other end of the coil L1, and a cathode terminal of the diode D3 is connected to one end of the snubber capacitor C2. Further, the other end of the snubber capacitor C2 is connected to a terminal on the low potential side of the fuel cell 110.

Moreover, the auxiliary circuit 22b includes a second series connected section composed of a diode D2, a second switching element S2 and a diode D1, and an auxiliary coil L2 common to all the phases. It is needless to say that the auxiliary coil L2 may be provided in each phase instead of the common auxiliary coil L2.

In the second series connected section, an anode terminal of the diode D2 is connected to a connecting node of the diode D3 and the snubber capacitor C2 in the first series connected section. Further, a cathode terminal of the diode D2 is connected to one end node of the second switching element (auxiliary switch) S2. The other end node of the second switching element S2 is connected to a connecting node of the auxiliary coil L2 and the freewheeling circuit 22c. An anode terminal of a freewheeling diode D6 is connected to the low potential side of the fuel cell 110, while a cathode terminal of the freewheeling diode D6 is connected to the auxiliary coil L2. This freewheeling circuit 22c is provided with the freewheeling diode D6 common to all the phases and is a circuit which realizes a failsafe function provided in order to prevent generation of surge voltage which might destroy the second switching element S2 even in the case of an open failure of the second switching element S2 during energization of the auxiliary coil L2. The present invention can be applied to a configuration not provided with the freewheeling circuit 22c.

In the thus configured FC soft switching converter 250, FC soft switching combating is realized by adjusting the switching duty ratio of the first switching element S1 in each phase by the controller 160.

Figure 4:
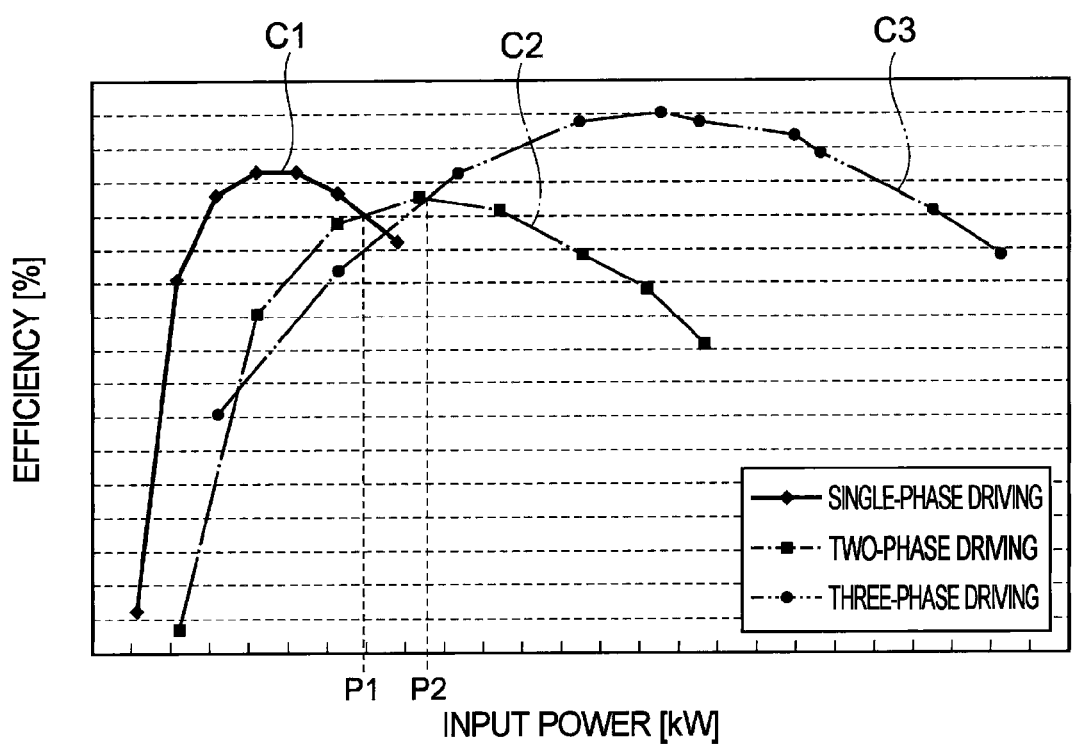
FIG. 4 is a diagram exemplifying a relationship between input power and energy conversion efficiency in single-phase driving, in a two-phase driving, and in a three-phase driving of the FC converter according to the embodiment.

FIG. 4 is a diagram exemplifying an efficiency map MP1 illustrating a relationship between input power and energy conversion efficiency in single-phase driving, in two-phase driving, and three-phase driving of the FC converter 2500. In FIG. 4, efficiency curves in the case of the single-phase driving, the two-phase driving, and the three-phase driving are shown by C1 to C3, respectively. In this embodiment, an example in which the single-phase driving is performed by using the U-phase, the two-phase driving is performed by the U-phase and the V-phase, and the three-phase driving by using the U-phase, the V-phase, and the W-phase will be described, but which phase is to be used for the single-phase driving, the two-phase driving, and the three-phase driving can be set/changed as appropriate.

In this embodiment, the number of driving phases is switched so that the energy conversion efficiency becomes the highest all the time. Specifically, the single-phase driving is performed from input power 0 to P1 shown in FIG. 4, the two-phase driving is performed from input power P1 to P2, and the three-phase driving is performed if the input power exceeds P2. By controlling the FC converter 2500 as above, the FC converter 2500 can be driven in a state in which the power conversion efficiency is the best all the time.

Figure 5:
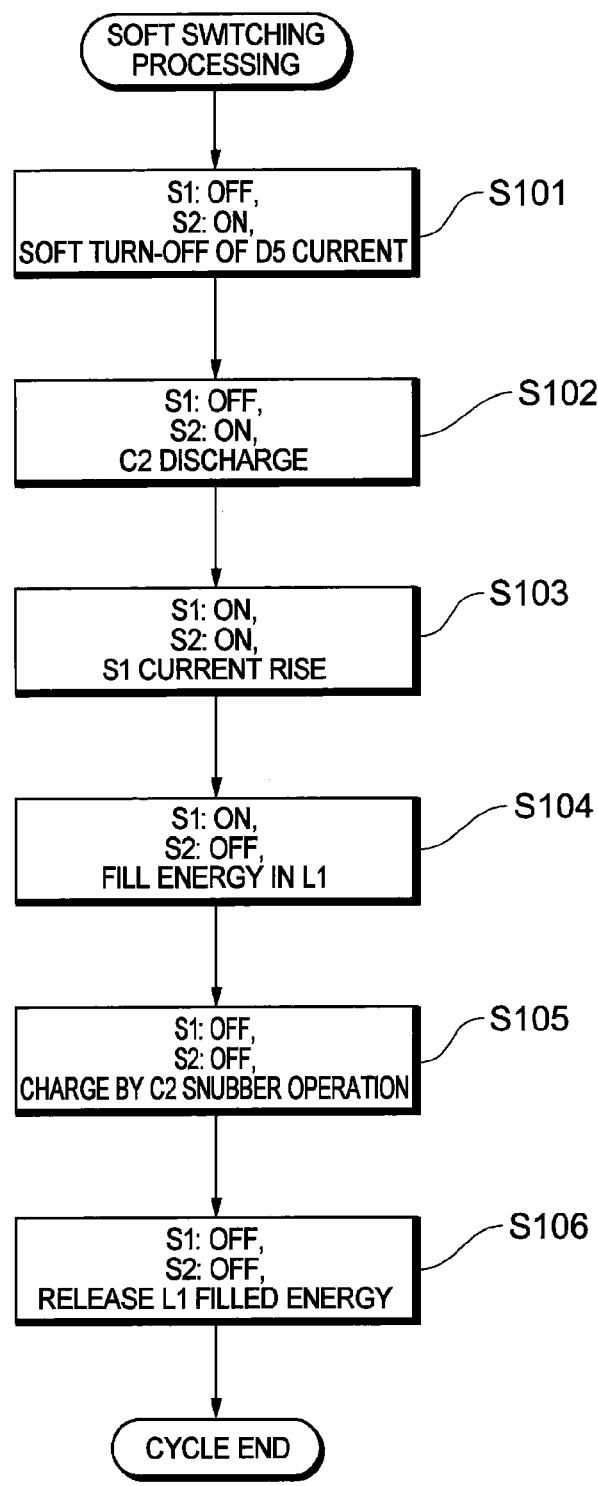
FIG. 5 is a flowchart illustrating soft switching processing according to the embodiment.

Subsequently, a soft switching operation by the FC soft switching converter 250 will be described by referring to FIGS. 5 to 11. FIG. 5 is a flowchart illustrating processing of a cycle of the FC soft switching converter 25 through a soft switching operation (hereinafter referred to as soft switching processing) and forms one cycle by the controller 160 which sequentially executes Steps S101 to S106 shown in FIG. 5. In the following description, modes expressing states of a current and a voltage of the FC soft switching converter 25 are expressed as a mode 1 to a mode 6, respectively, and the states are shown in FIGS. 6 to 11. Also, currents flowing through the circuit are indicated by arrows in FIGS. 6 to 11.

Soft Switching Operation

First, an initial state in which the soft switching processing shown in FIG. 5 is executed is a state in which power required for the load 130 is supplied form the fuel cell 110, that is, a state in which the first switching element S1 and the second switching element S2 are both turned off, whereby a current is supplied to the load 130 through the coil L1 and the diode D5.

Mode 1; See FIG. 6

Figure 6:
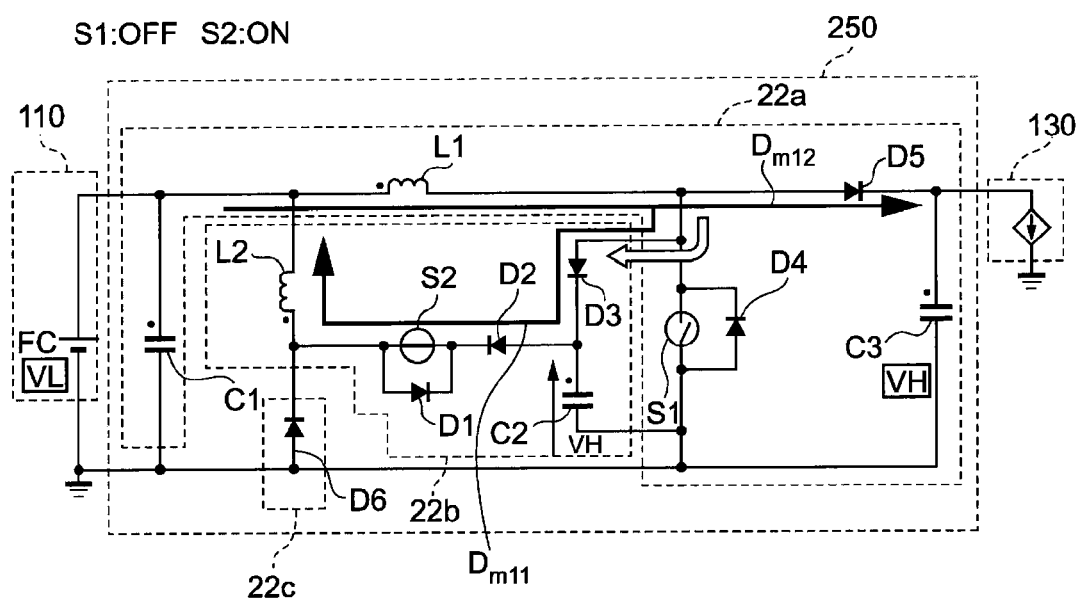
FIG. 6 is a diagram illustrating an operation of a mode 1.

At step S101, turn-off of the first switching element S1 is held, while the second switching element S2 is turned on. By performing such switching operation, due to a potential difference between the output voltage VH and the input voltage VL of the FC soft switching converter 150, a current having flowing to the load 130 side gradually moves to the auxiliary circuit 12b side through the coil L1, the diode D3, the second switching element S2, and the auxiliary coil L2. In FIG. 6, the state of the transition of the current from the load 130 side to the auxiliary circuit 12b side is indicated by a framed arrow.

Also, by turning on the second switching element S2, circulation of the current is generated in the direction of an arrow Dm11 shown in FIG. 6. A current change rate of the second switching element S2 increases in accordance with a both-end voltage (VH–VL) of the auxiliary coil L2 and inductance of the auxiliary coil L2, but since the current flowing to the second switching element S2 is suppressed by the auxiliary coil L2, soft turn-off of the current flowing to the load 130 side through the diode D5 (See an arrow Dm12 shown in FIG. 6) is realized as a result.

Transition completion time tmode1 from the mode 1 to the mode 2 is expressed by the following equation (4):

$$tmode1 = \max\left(Ip - \frac{\Delta I}{2}, 0\right) \times \frac{L2id}{(VH - VL)} \quad (4)$$

Ip: phase current
L2id: inductance of auxiliary coil L2

Mode 2: See FIG. 7

Figure 7:
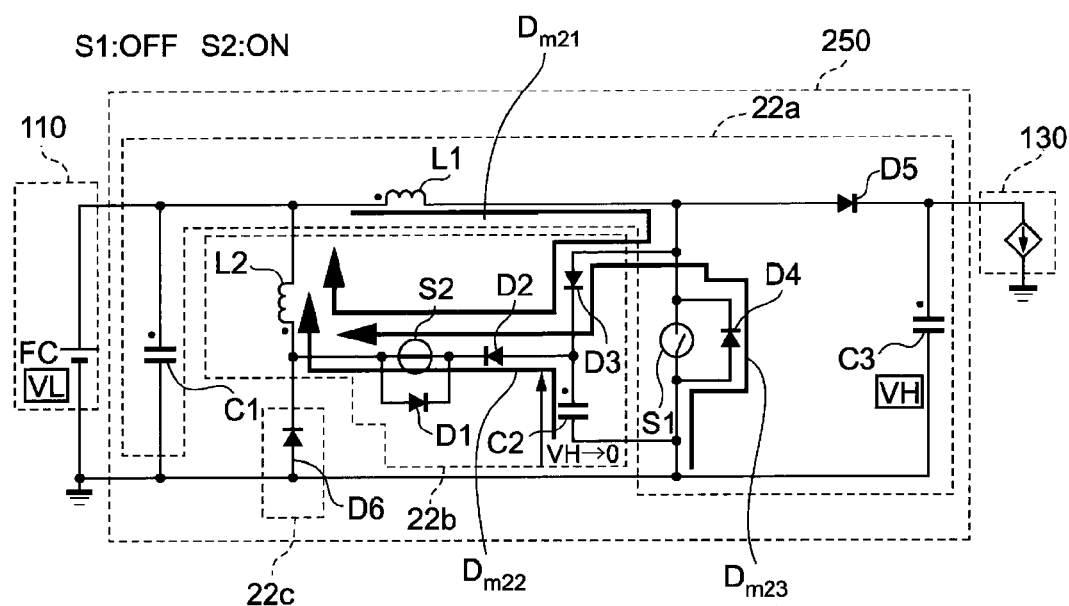
FIG. 7 is a diagram illustrating an operation of a mode 2.
Figure 8:
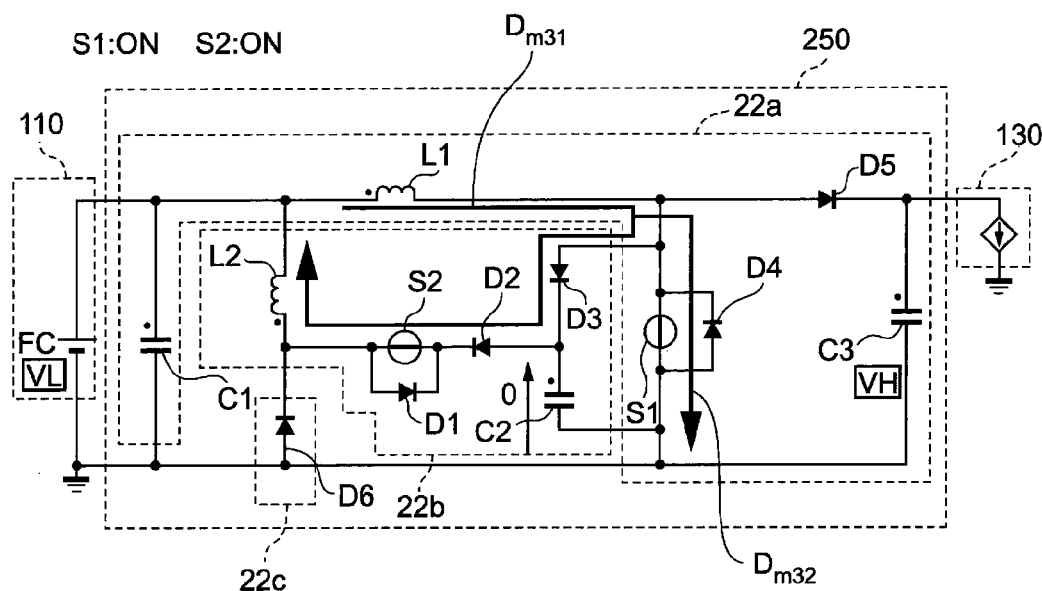
FIG. 8 is a diagram illustrating an operation of a mode 3.

When the above transition completion time has elapsed and the routine proceeds to Step S102, the current flowing through the diode D5 falls to zero, the current flows into the auxiliary circuit 12b side through the coil L1 and the diode D5 (See an arrow Dm21 shown in FIG. 7) and due to the potential difference between the snubber capacitor C2 and the voltage V1 of the fuel cell 110, instead, charges having charged the snubber capacitor C2 flow to the auxiliary circuit 12b side (See an arrow Dm22 shown in FIG. 7). In accordance with the capacity of this snubber capacitor C2, the voltage to be applied to the first switching element S1 is determined.

Figure 13:
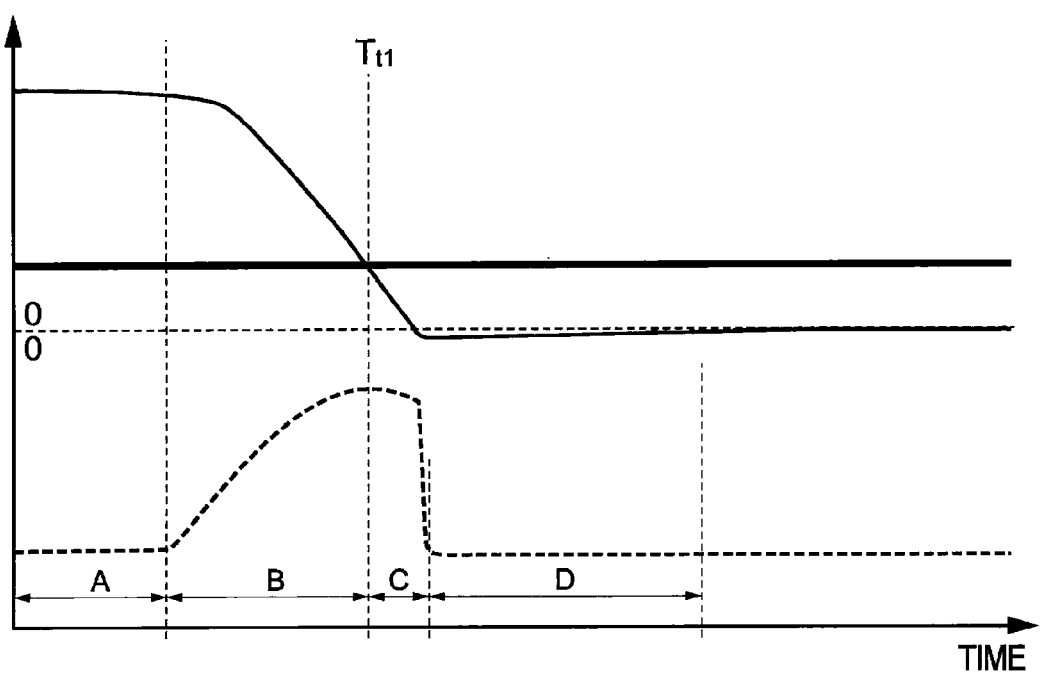
FIG. 13 is a diagram illustrating a voltage/current behavior in a transition process from the mode 2 to the mode 3.

FIG. 13 is a diagram illustrating behaviors of the voltage/current in the transition process from the mode 2 to the mode 3, in which the voltage of the fuel cell 110 is indicated by a bold solid line, the voltage of the snubber capacitor C2 by a thin solid line, and the current of the snubber capacitor C2 by a broken line.

After energization of a path by the Dm21 shown in FIG. 7 is started (See A shown in FIG. 13), due to the potential difference between the voltage VH of the snubber capacitor C2 and the voltage VL of the fuel cell 110, energization of a path by the Dm22 shown in FIG. 7, that is, energization of the auxiliary coil L2 is started (See B shown in FIG. 13). As shown in FIG. 13, the current in the snubber capacitor C2 continues to rise until the voltage of the snubber capacitor C2 reaches the voltage VL of the fuel cell 110. In detail, due to the potential difference between the voltage VH of the snubber capacitor C2 and the voltage VL of the fuel cell 110, the charges accumulated in the snubber capacitor C2 start to be regenerated to the power supply side (the arrow Dm22 shown in FIG. 7), but since the original potential difference is (VH–VL), the flow of the changes accumulated in the snubber capacitor C2 (discharge) should have been stopped when it reaches the power-supply voltage (that is, the voltage VL of the fuel cell 110) (timing Tt1 shown in FIG. 13), but due to the characteristics of the auxiliary coil L2 (that is, the characteristic to continuously allow the current to flow), the charges continue to flow even if the voltage of the snubber capacitor C2 falls to VL or less (See C shown in FIG. 13). If the following equation (4)' holds true at this time, all the charges of the snubber capacitor C2 flow (are discharged).

$$\frac{1}{2}L*I^2 > \frac{1}{2}C*V^2 \quad (4)'$$

Left side: energy accumulated in auxiliary coil L2
Right side: energy remaining in snubber capacitor C2

If the charges accumulated in the snubber capacitor C2 are gone, a freewheeling operation is performed in the path of a Dm23 shown in FIG. 7, and energization is continued (See D shown in FIG. 13). As a result, all the energy accumulated in the auxiliary coil L2 is emitted. Since the anode of the diode D2 is connected to one end of the auxiliary coil L2, LC resonance stops at half waves. Therefore, the snubber capacitor C2 holds 0V after the discharge.

The transition completion time tmode2 from the mode 2 to the mode 3 is expressed by the following equation (5):

$$tmode2 = tmode2' + tmode2'' \quad (5)$$

$$tmode2' = \pi\sqrt{L2id*C2d} \quad (5)'$$

$$tmode2'' = \max\left(Ip - \frac{\Delta I}{2}, 0\right) \times \frac{L2id}{VL} \quad (5)''$$

C2d: capacity of capacitor C2

Mode 3: See FIG. 8

When the operation in which the current flows through the path of Dm22 shown in FIG. 7 is finished and the charges of the snubber capacitor C2 have completely drained or the voltage falls to the minimum voltage (MIN voltage), the first switching element S1 is turned on, and the routine proceeds to Step S103. In a state in which the voltage of the snubber capacitor C2 is zero, the voltage applied to the first switching element S1 is also zero, and ZVS (Zero Voltage Switching) is realized. In such a state, a current Il1 flowing through the coil L1 is the sum of a current Idm31 flowing on the auxiliary circuit 12b side shown by an arrow Dm31 and a current Idm32 flowing through the first switching element S1 shown by an arrow Dm32 (See the following equation (6)).

$$Il1 = Idm31 + Idm32 \quad (6)$$

The current Idm31 flowing through the first switching element S1 is determined in accordance with the decreasing rate of the current Idm31 flowing on the auxiliary circuit 12b side. The current changing rate of the current Idm31 flowing on the auxiliary circuit 12b side is expressed by the following equation (7), that is, since the current Idm31 flowing on the auxiliary circuit 12b side decreases at the changing rate of the following equation (7), even if the first switching element S1 is turned on, the current flowing through the first switching element S1 does not suddenly rise but ZCS (Zero Current Switching) is realized.

$$\frac{di}{dt} = \frac{-VL}{L2} \quad (7)$$

Mode 4: See FIG. 9

Figure 9:
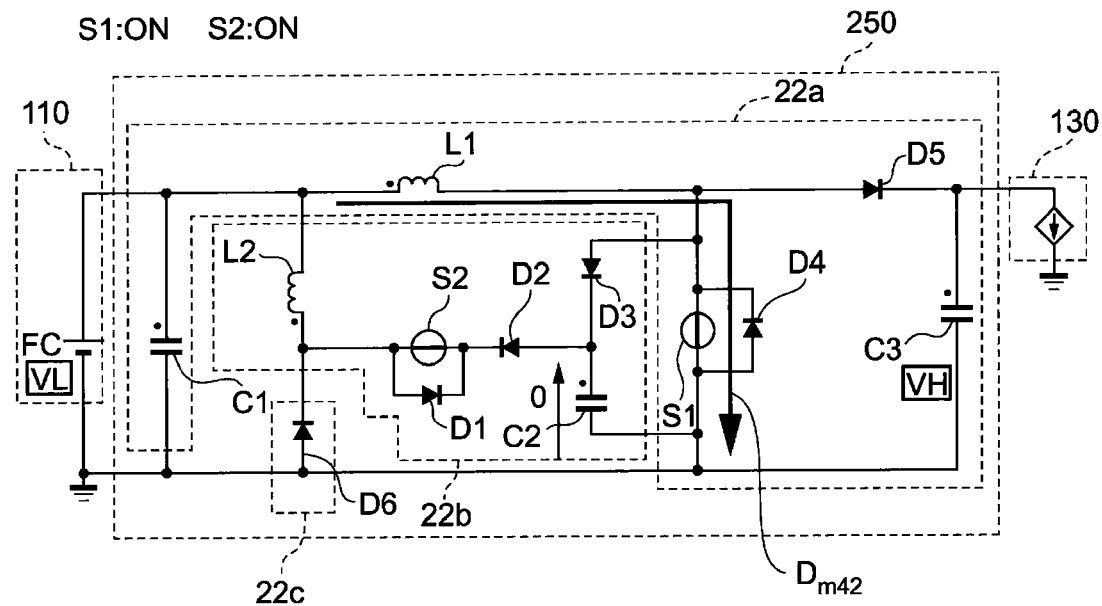
FIG. 9 is a diagram illustrating an operation of a mode 4.

Then, at Step S104, since the state at Step S103 continues, a current amount flowing into the coil L1 increases so as to gradually increase energy accumulated in the coil L1 (See an arrow Dm42 in FIG. 9). Since the diode D2 is present in the auxiliary circuit 12b, a reverse current does not flow to the auxiliary coil L2, and the snubber capacitor C2 is not charged through the second switching element S2. Also, since the first switching element. S1 has been turned on at this point of time, the snubber capacitor C2 is not charged, either, through the diode D3. Therefore, the current of the coil L1=the current of the first switching element S1 is realized, and the energy accumulated in the coil L1 is gradually increased. Turn-on time Ts1 of the first switching element S1 is expressed approximately by the following equation (8):

$$Ts1 = (1 - VL/VH)*Tcon \quad (8)$$

Tcon: control cycle

The control cycle refers to a time period of the soft switching processing when a series of processing from Step S101 to Step S106 is assumed to be one cycle.

Mode 5: See FIG. 10

Figure 10:
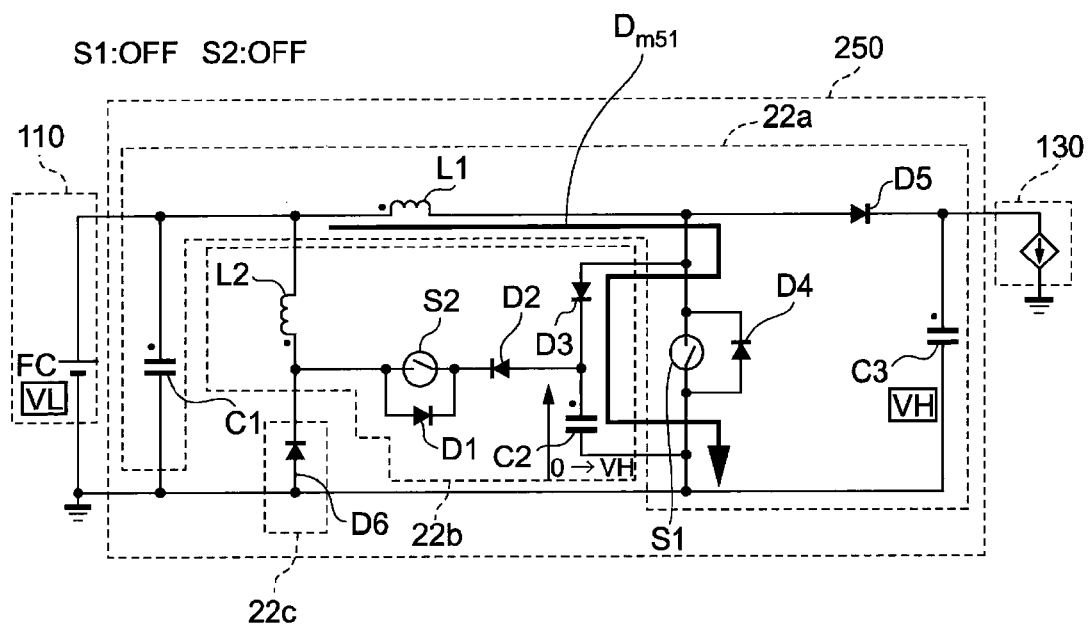
FIG. 10 is a diagram illustrating an operation of a mode 5.
Figure 12:
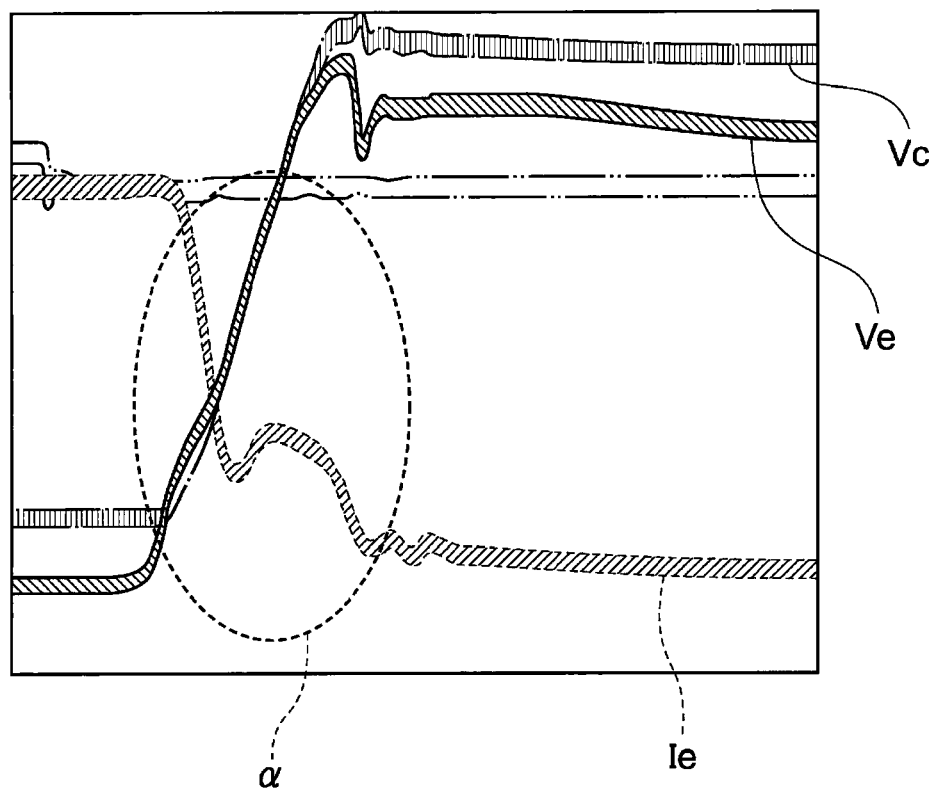
FIG. 12 is a diagram exemplifying a relationship among a snubber capacitor voltage Vc, an element voltage Ve, and an element current Ie of the mode 5.

When desired energy has been accumulated in the coil L1 at Step S104, a first switching element S12 is turned off, and a current flows through a path shown by an arrow Dm51 in FIG. 10. FIG. 12 is a diagram exemplifying a relationship among the voltage of the snubber capacitor C2 (hereinafter referred to as snubber capacitor voltage) Vc, a voltage applied to the first switching element S1 (hereinafter referred to as element voltage) Ve, and a current flowing through the first switching element S1 (hereinafter referred to as element current) Ie in the mode 5. By means of the above-described switching operation, the snubber capacitor C2 which has been discharged and brought into a low-voltage state in the mode 2 is charged, whereby the snubber capacitor voltage Vc rises toward the converter output voltage VH of the FC soft switching converter 150. At this time, the rising speed of the element voltage Ve is suppressed by charging to the snubber capacitor C2 (that is, rise of the element voltage is dulled), and the ZVS operation to reduce switching loss in a region where a tail current is present (See α shown in FIG. 12) in the element current. Ve can be performed.

Mode 6: See FIG. 11

Figure 11:
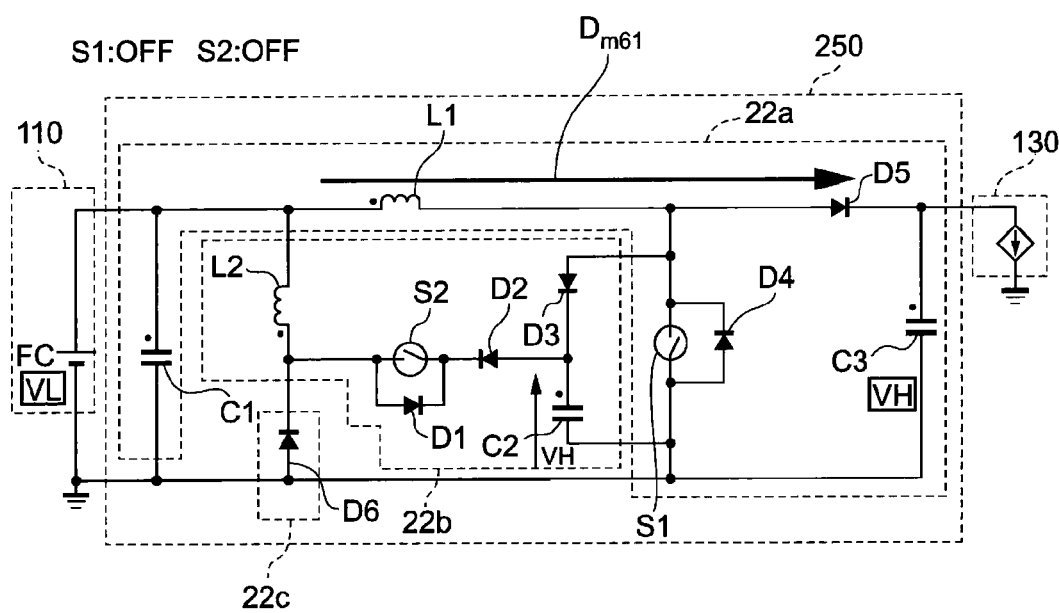
FIG. 11 is a diagram illustrating an operation of a mode 6.

When the snubber capacitor C2 is charged to the voltage VH, the energy accumulated in the coil L1 is released to the load 130 side (See an arrow Dm61 shown in FIG. 11). Turn-off time Ts2 of the first switching element S1 is approximately expressed by the following equation (9):

$$Ts2 = (VL/VH)*Tcon \quad (9)$$

By performing the above-described soft switching processing, switching loss of the FC soft switching converter 250 is suppressed as much as possible, while the output voltage of the fuel cell 110 is boosted to a desired voltage and can be supplied to the load 130.

Figure 14:
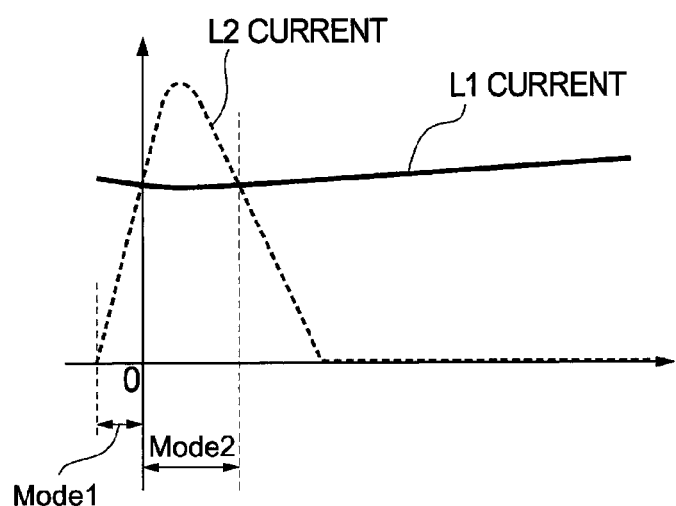
FIG. 14 is a diagram exemplifying an energization pattern in each mode.

FIG. 14 is a diagram exemplifying an energization pattern in each mode of the FC soft switching converter 250, in which a current flowing through the coil L1 is indicated by a bold solid line and a current flowing through the auxiliary coil L2 is indicated by a broken line.

As shown in FIG. 14, if the second switching element is turned on, the auxiliary circuit 12b is operated, and a current flows through the auxiliary coil L2 (See Mode 1 and Mode 2 shown in FIG. 14). In the FC soft switching converter 25 in each phase, if time when the current flows through the auxiliary coil L2 (hereinafter referred to as auxiliary circuit operating time) Tso is overlapped, the operation of the auxiliary circuit in each phase interferes with each other, and a current Iu not less than the maximum allowable current Imax (that is, a current not less than two phases) flows through the auxiliary coil L2, whereby the inductance characteristics of the auxiliary coil L2 are deteriorated.

In order to solve the above problem, control is executed so that deviation of a duty ratio set for the second switching element S2 in each phase does not exceed a duty deviation allowable value Dth expressed by the following equation (10):

$$Dth = \frac{(Tsc/n - Tso)}{Tsc} = 1/n - Tso * f \qquad (10)$$

f: driving frequency of switching element S2
Tsc: 1 cycle period (=1/f)
n: number of driving phases
The auxiliary circuit operation time Tso is expressed by the following equation (11):

$$Tso = tmode1 + tmode2 = \max\left(Ip - \frac{\Delta I}{2}, 0\right) \times \frac{L2id}{(VH - VL)} + \pi\sqrt{L2id * C2d} + \max\left(Ip - \frac{\Delta I}{2}, 0\right) \times \frac{L2id}{VL} \qquad (11)$$

In this embodiment, control is executed such that the duty deviation between the phases does not exceed the duty deviation allowable value Dth acquired by the equation (10). More specifically, control is made such that a duty ratio D(u) of the U-phase, a duty ratio D(v) of the V-phase, and a duty ratio D(w) of the W-phase satisfy the following equations (12) to (14):

$$D(v)-D(u)<Dth \qquad (12)$$

$$D(w)-D(v)<Dth \qquad (13)$$

$$D(u)-D(w)<Dth \qquad (14)$$

Method for Reducing Ripple Current

Figure 15:
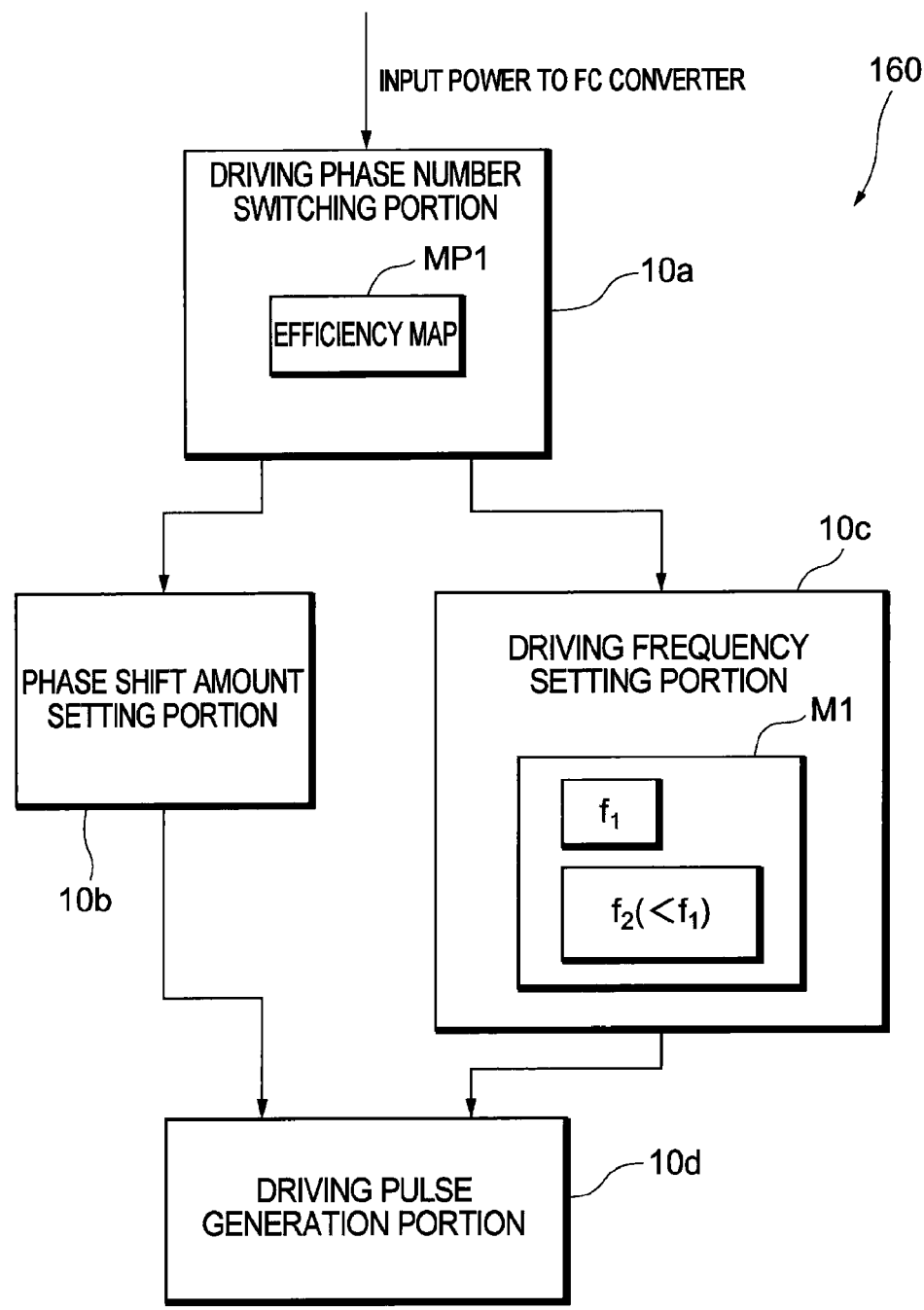
FIG. 15 is a functional block diagram for realizing a function of reducing a ripple current.

FIG. 15 is a functional block diagram for realizing a function of reducing ripple currents.

The controller 160 includes a driving phase number switching portion 10a, a phase shift amount setting portion 10b, a driving frequency setting portion 10c, and a driving pulse generation portion 10d.

The driving phase number switching portion (determining means) 10a refers to the input power into the FC converter 2500 derived from FC required power and an efficiency map MP1 stored in a memory or the like in advance and executes control of switching of the driving phase. For example, if the FC required power is rapidly increased by stepping on an accelerator pedal or the like and it is determined that switching of the driving phase number is needed from the viewpoint of power conversion efficiency (single-phase driving→multiphase driving, for example), the driving phase number switching portion 10a switches the driving phase number (U-phase→U-phase+V-phase, for example) on the basis of this determination result. Also, when the driving phase number switching portion 10a switches the driving phase number, it notifies the phase shift amount setting portion 10b and the driving frequency setting portion 10c of the switching of the driving phase number (including the switching contents of the driving phase number).

The phase shift amount setting portion 10b sets a phase shift amount of the operation of the switching element S1 in each phase so that the ripple currents are reduced on the basis of the notification from the driving phase number switching portion 10a. Specifically, the phase shift amount is set to 180° in the case of the two-phase driving and to 120° in the case of the three-phase driving, and this is notified to the driving pulse generation portion 10d. As described above, in the case of the multiphase driving, the operation of the switching element S1 in each phase is controlled by shifting the phase so as to cancel the ripple currents, whereby the allowable amount of the capacitor can be reduced as before.

However, as described in the problems to be solved, only by driving the DC-DC converter by shifting the phase, there is a limitation on reduction of the allowable amount of the capacitor, and the recent demand for further size reduction of the capacitor cannot be fully met. Thus, in this embodiment, the driving frequency setting portion 10c is provided, and a switching frequency is switched in accordance with the driving phase number.

The driving frequency setting portion (driving frequency control means) 10c sets the switching frequency of the switching element S1 on the basis of the notification from the driving phase number switching portion 10a. As shown in the following equation (15), the ripple current ΔI detected by a current sensor 10 is in proportion to the input voltage Vin into the FC converter 2500 and the duty ratio D and in inverse proportion to the switching frequency f and the inductance L of the coil (hereinafter referred to as reactor as appropriate) L1.

$$\Delta I = \frac{Vin * D}{L * f} \qquad (15)$$

Figure 16:
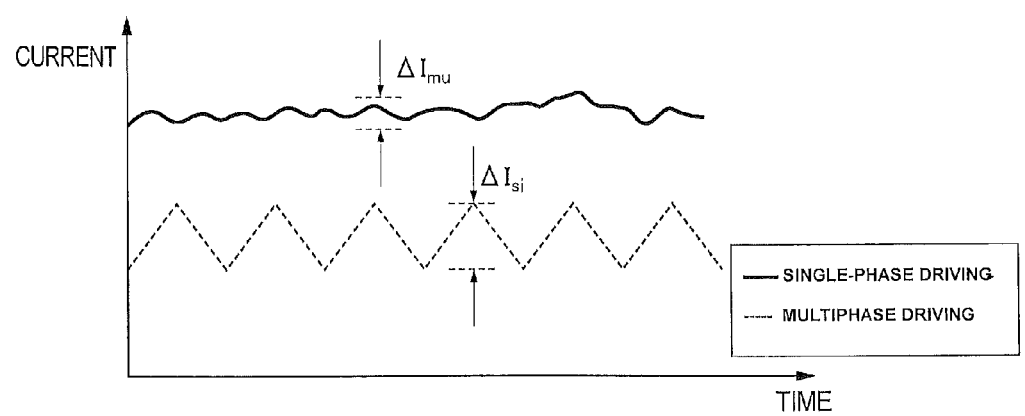
FIG. 16 is a diagram which compares a ripple current ΔIsi in single-phase driving and a ripple current ΔImu in multiphase driving.

As shown in the equation (15), theoretically, the higher the switching frequency f is set, the smaller the ripple current ΔI can be made, and from the viewpoint of reduction of the ripple current, the switching frequency is preferably set high all the time. However, if the switching frequency is set high, the switching loss is increased by that portion. Thus, from the viewpoint of the switching loss, it is desirable that setting of the high switching frequency f is suppressed as much as possible. FIG. 16 is a diagram which compares a ripple current ΔIsi in the single-phase driving (solid line) and a ripple current ΔImu in the multiphase driving (broken line). As shown in FIG. 16, the ripple current ΔIsi in the single-phase driving is larger than the ripple current ΔImu in the multiphase driving (three-phase driving is assumed in FIG. 16). As described above, since the ripple current ΔIsi is the largest in the single-phase driving, both the ripple current and the switching loss are considered in this embodiment, and the switching frequency f1 is set high only for the single-phase driving. As described above, by reducing the ripple current ΔIsi in the single-phase driving in which the ripple current is the largest, the allowable amount of the filter/capacitor C1 is made smaller, and the size of the filter/capacitor C1 can be reduced than before in the end.

In more detail, in memory M1 of the driving frequency setting portion 10c, the switching frequency f1 for the single-phase driving and the switching frequency f2 (<f1) for the multiphase driving are stored (See FIG. 15). In the case of the single-phase driving of the FC converter 2500 (only the U-phase, for example), the driving frequency setting portion 10*b* reads out the switching frequency f1 for the single-phase driving from the memory M1 and outputs it to the driving pulse generation portion 10*d*, while in the case of the multiphase driving of the FC converter 2500 (U-phase+V-phase or U-phase+V-Phase+W-phase, for example), the driving frequency setting portion 10*b* reads out the switching frequency f2 for the multiphase driving from the memory M1 and outputs it to the driving pulse generation portion 10*d*.

The switching frequency f1 for the single-phase driving and the switching frequency f2 for the multiphase driving stored in the memory M1 may be set, considering the ripple current ΔI acquired by an experiment or the like in advance or the switching loss. Also, how much higher the switching frequency for the single-phase driving is set than the switching frequency for the multiphase driving may be set, considering the ripple current ΔI acquired by an experiment or the like in advance or the switching loss, and moreover, each switching frequency may be changed to an optimal value on the basis of a detection result of the fed-back ripple current ΔI or the switching loss.

The driving pulse generation portion 10*d* controls the on/off operation of the first switching element S1 by creating the driving pulse and outputting it to the first switching element S1 on the basis of the phase shift amount notified by the phase shift amount setting portion 10*b* and the switching frequency notified by the driving frequency setting portion 10*c*.

As described above, according to this embodiment, not only that the DC-DC converter is driven by simply shifting the phase but also the switching frequency f1 for the single-phase driving is set higher than the switching frequency f2 (<f1) for the multiphase driving in order to reduce the ripple current ΔIsi in the single-phase driving in which the ripple current is the largest. As a result, since the largest ripple current ΔIsi can be reduced, the allowable amount of the filter/capacitor C1 designed in accordance with this ripple current ΔIsi can be reduced, whereby the size of the filter/capacitor C1 can be made smaller than before in the end.

In the above-described embodiment, only in the single-phase driving, the switching frequency is set high, and the switching frequency is set low in the multiphase driving, but it may be so configured that the switching frequency is set low only for the three-phase driving in which the switching loss is the largest and the switching frequency is set high for the single-phase driving and the two-phase driving in which the influence of the switching loss is smaller than the three-phase driving, for example.

B. Variation

Variation 1

In the above-described embodiment, a method in which the switching frequency f1 for the single-phase driving is set higher than the switching frequency f2 (<f1) for the multiphase driving so as to reduce the ripple current ΔIsi in the single-phase driving is exemplified, but instead of the configuration of this embodiment (or in addition to the configuration of this embodiment), the inductance (the reactor value) L of the coil L1 of the phase used for the single-phase driving (U-phase, for example) may be set larger than the inductance L of the coil L1 in another phase, for example.

As shown in the above equation (15), since the ripple current ΔI is in inverse proportion to the inductance L, by setting the inductance L larger, the ripple current can be reduced similarly to this embodiment, and thus, the allowable amount of the filter/capacitor C1 can be made small, and the size of the filter/capacitor C1 can be made smaller than before in the end.

Figure 17:
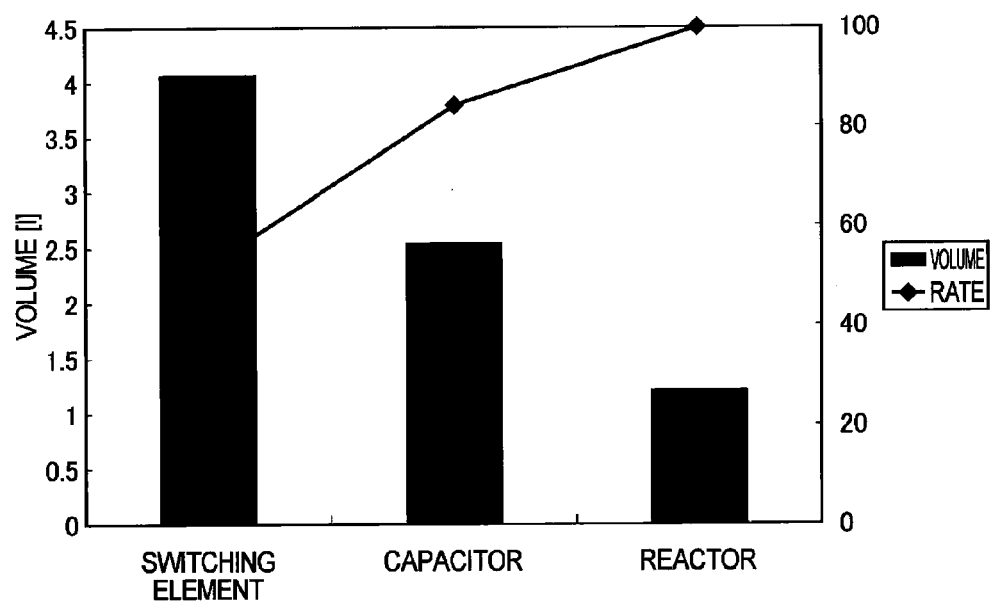
FIG. 17 is a diagram illustrating rates of the sizes of major components in the DC-DC converter.
Figure 18:
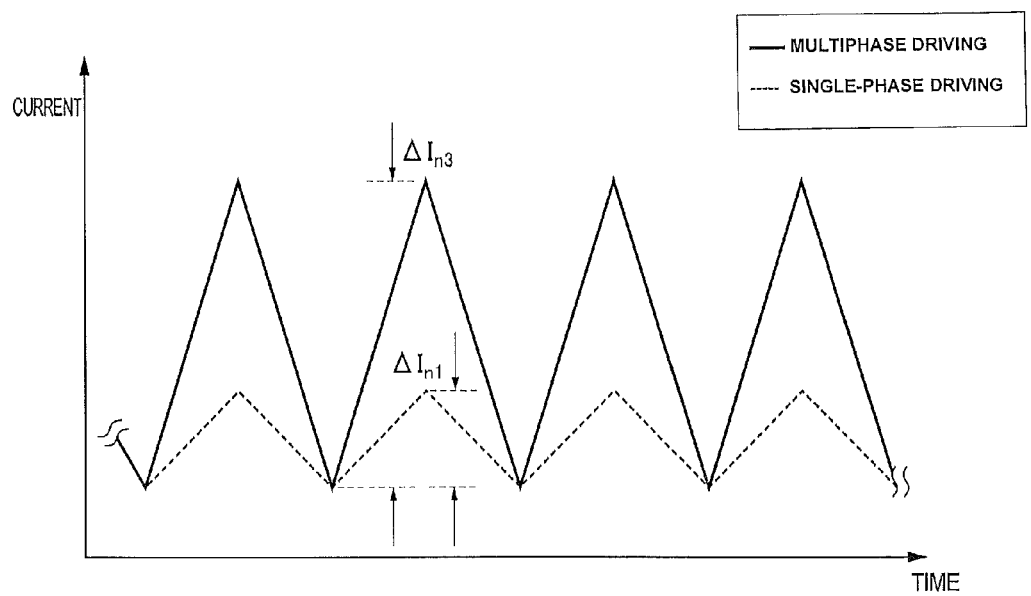
FIG. 18 is a diagram exemplifying current waveforms of single-phase driving of a three-phase DC-DC converter and multiphase driving in the same phase.
Figure 19:
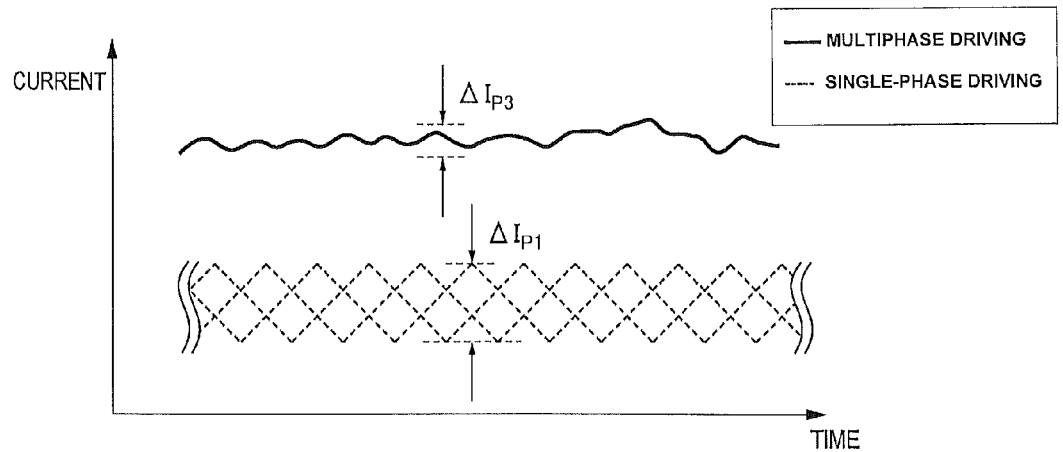
FIG. 19 is a diagram exemplifying the current waveforms of the single-phase driving of the three-phase DC-DC converter and the multiphase driving by shifting the phase.

If the inductance L is large, the size of the reactor becomes large, but the rates of the sizes of major components in the DC-DC converter is, as shown in FIG. 17, larger in size of the capacitor than the reactor, and even if the reactor is made larger, size reduction of the capacitor is more advantageous from the view point of size reduction of the DC-DC converter.

Variation 2

In the above-described embodiment, the filter/capacitor C1 is exemplified as a capacitor whose size is to be reduced, but instead (or in addition), the embodiment can be also applied to the capacitor C3.

Variation 3

In the above-described embodiments and variations, the example of the multiphase FC soft switching converter was described, but they can be also applied to a multiphase FC hard switching converter not provided with a soft switching function.

REFERENCE SIGNS LIST

10*a* ... DRIVING PHASE NUMBER SWITCHING PORTION, 10*b* ... PHASE SHIFT AMOUNT SETTING PORTION, 10*c* ... DRIVING FREQUENCY SETTING PORTION, 10*d* ... DRIVING PULSE GENERATION PORTION, M1 ... MEMORY, MP1 ... EFFICIENCY MAP, 100 ... FCHV SYSTEM, 110 ... FUEL CELL, 120 ... BATTERY, 130 ... LOAD, 140 ... INVERTER, 2500 ... FC CONVERTER, 160 ... CONTROLLER, 170 ... SENSORS, 180 ... BATTERY CONVERTER, 250 ... FC SOFT SWITCHING CONVERTER, 400 ... GATE VOLTAGE CONTROL CIRCUIT, 410 ... POWER SUPPLY, 420 ... TURN-ON CONTROL PORTION, 430 ... TURN-OFF CONTROL PORTION, 440 ... DRIVE CIRCUIT, 22*a* ... MAIN BOOST CIRCUIT, 22*b* ... AUXILIARY CIRCUIT, 22*c* ... FREEWHEELING CIRCUIT, S1, S2 ... SWITCHING ELEMENT, C1, C3 ... SMOOTHING CAPACITOR, C2 ... SNUBBER CAPACITOR, L1, L2 ... COIL, D1, D2, D3, D4, D5 ... DIODE, D6 ... FREE WHEELING DIODE.

The invention claimed is:

1. An apparatus for a multiphase converter for controlling a fuel cell output, which controls driving of each phase by shifting the phase, comprising a controller that includes:
   a driving frequency control device which sets a driving frequency of a converter in a case of single-phase driving of the multiphase converter higher by a predetermined amount than a driving frequency of the converter in a case of multiphase driving, and
   a determining device which determines a number of driving phases of the multiphase converter in accordance with a size of a load connected to the multiphase converter,
   wherein the controller is programmed to control the driving frequency control device to set the driving frequency of the converter in the single-phase driving on a basis of a predetermined desired size of a ripple current and a predetermined desired size of a switching loss generated in the single-phase driving.

2. The apparatus for the multiphase converter according to claim 1, wherein a converter for each of the phases is a soft switching converter including a main boost circuit and an auxiliary circuit, the main boost circuit has a main coil having one end thereof connected to a terminal on a high potential side of the fuel cell, a main switch for switching operation having one end thereof connected to another end of the main coil and having another end thereof connected to a terminal on a low potential side of the fuel cell, a first diode having a cathode connected to the other end of the main coil, and a smoothing capacitor provided between an anode of the first diode and another end of the main switch, the auxiliary circuit has a first series connected section including a second diode and a snubber capacitor, the first series connected section being connected in parallel to the main switch and connected to the other end of the main coil and to a terminal on the low potential side of the fuel cell, and a second series connected section including a third diode, an auxiliary coil, and an auxiliary switch, the second series connected section being connected between a connecting node of the second diode with the snubber capacitor and the one end of the main coil.

\* \* \* \* \*